United States Patent [19]

McPeak

[11] 3,855,884
[45] Dec. 24, 1974

[54] LOCKING UNIVERSAL JOINT
[76] Inventor: Warren L. McPeak, 3341 N. El Burrito, Tucson, Ariz. 85705
[22] Filed: Oct. 1, 1973
[21] Appl. No.: 402,264

Related U.S. Application Data
[63] Continuation-in-part of Ser. No. 320,203, Jan. 2, 1973, abandoned.

[52] U.S. Cl............................................. 81/177 UJ
[51] Int. Cl............................................. B25b 13/00
[58] Field of Search....... 81/177 UJ, 177 A; 403/57, 403/114, 116, 123

[56] References Cited
UNITED STATES PATENTS
1,643,855  9/1927  Peterson..................... 81/177 UJ X Primary Examiner—Al Lawrence Smith
Assistant Examiner—James G. Smith
Attorney, Agent, or Firm—James A. Eyster

[57] ABSTRACT

A conventional universal joint is modified by elongating its output shaft and by providing this shaft with a sliding collar. The shaft carries a flange near its end to prevent removal of the collar. Two holes are provided in the output shaft and a single diametral hole is provided in the collar. When the collar is slid to one of its extreme positions, against the body of the universal joint, the collar hole is aligned with one of the shaft holes and a pin is used to hold the collar in that position, immobilizing the universal joint. When the collar is slid to its other extreme position, against the flange, the collar hole is aligned with the other shaft hole. The collar, pinned in this position, now permits the universal joint to move to any angle within its limits.

6 Claims, 7 Drawing Figures

LOCKING UNIVERSAL JOINT

CROSS-REFERENCE TO RELATED APPLICATION

This is a continuation-in-part of patent application No. 320,203., filed Jan. 2, 1973, now abandoned, having the same title and the same applicant.

BACKGROUND OF THE INVENTION

This invention relates to universal joints, and particularly to such a joint used in combination with an impact wrench.

Impact wrenches are commonly used in industry to tighten nuts by repeated blows automatically applied, with compressed air as the energy source.

One example of their use is in automobile service stations to apply and remove nuts fastening automobile wheels. Sometimes the impact wrench is provided with a limit release to tighten the nut by a specific amount.

Another place where the impact wrench is commonly used is in the erection of steel frame buildings. In the erection of structural steel, impact wrenches have been found so useful that they are nearly indispensible. In such work a universal joint is often used in applying the wrench to a nut at an angle. Here a universal joint, a separate unit, is put between the impact wrench output shaft and the socket fitting the nut.

However, both the impact wrench tool and the universal joint are ponderous in the large sizes used in steel erection. Applying or removing the universal joint is inconvenient, but must frequently be done, for the wrench combined with the universal joint is only with some difficulty employed to drive a nut which can be approached directly, or in a straight line with the bolt on which the nut is to be driven.

Thus there is a need for a universal joint which can be used to drive through an angle, or locked to drive a nut in a straight line.

SUMMARY OF THE INVENTION

This invention provides such a locking universal joint. It is designed particularly for use with massive impact wrenches, but can be used in smaller sizes with small impact wrenches.

The locking universal joint provides a universal joint with a socket for a wrench shaft at one end, and a shaft at the other end. This shaft is designed to be fitted into a wrench socket. On this shaft there is provided a loose collar which can slip a short distance along the shaft. The collar is prevented from slipping off the shaft by a flange near the shaft end.

When the collar is slipped toward the universal joint body, and secured there, it holds the joint in a straight line. When the collar is slipped away from the joint, to the flange and secured, the collar no longer locks the joint, which is now free to move to any angle within its range.

The collar is provided with two secured positions, so that it can be fixed at either of its two extreme positions on the shaft.

In a second embodiment, the universal joint is combined with the wrench socket.

An object of this invention is to provide a mechanical device which, by a simple internal adjustment, can transmit shaft rotation either through an angle or in a straight line.

Another object of this invention is to provide a universal joint which can be locked in either of two conditions, to transmit rotary shaft motion in a straight line or to transmit through an angle.

DESCRIPTION OF THE PREFERRED EMBODIMENTS

Figure 1:
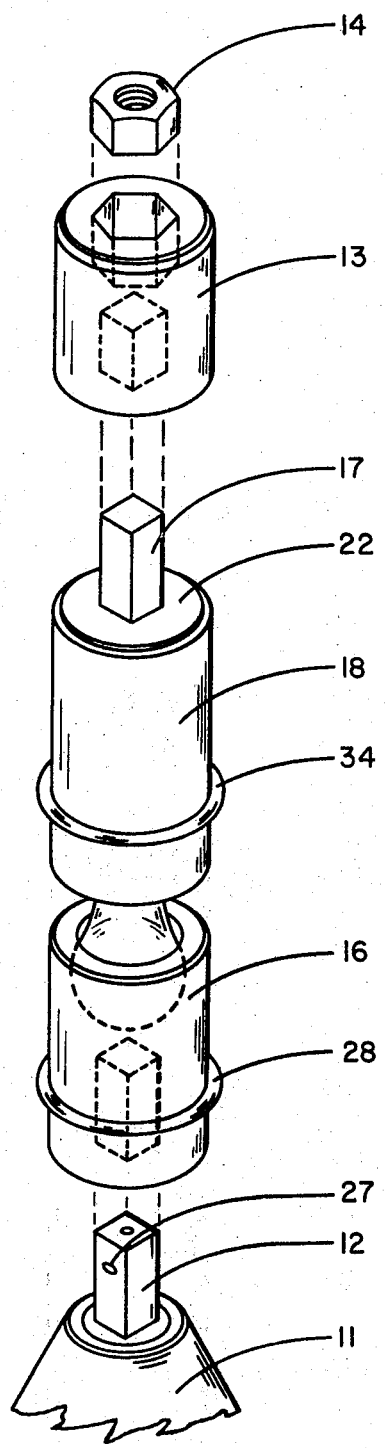
FIG. 1 is an exploded view of the locking universal joint including the driving shaft of an impact wrench and a nut to be driven.

Referring to FIG. 1, 11 is an impact wrench partly shown, with its rotatable square output shaft 12. When used without a universal joint this shaft is fitted into a wrench socket 13 for rotation of a nut 14. When the impact wrench is used with a conventional universal joint, similar to universal joint 16 except with a standard short square output shaft, the shaft 12 is inserted into the universal joint socket and the output shaft thereof is fitted into the socket 13.

Figure 2:
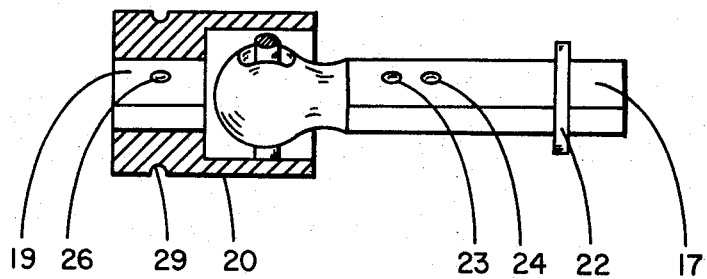
FIG. 2 is a side view, partly in section, of a conventional universal joint except that its output shaft is elongated, and bears a flange.

The universal joint of this invention has an elongated output shaft 17, which carries an element or collar 18. The universal joint 16, without the collar 18, is shown in FIG. 2. It contains a socket or square hole 19 in one end of its body 20 for the reception of the impact wrench shaft 12. At the other end the universal joint 16 has the elongated shaft 17. This shaft is provided with a flange, 22, welded to the shaft near its end. The shaft 17 is provided with two holes, 23 and 24 and should be made of case-hardened steel. The end containing the socket 19 is drilled at 26, as is the impact wrench shaft, FIG. 1, at 27. These holes are for the reception of a pin (not shown), locking the impact wrench shaft 12 and the universal joint socket 19 together. A round rubber band, 28, fits into a slot 29 to prevent the pin from falling out, a standard procedure used in such a tool.

Figure 4:
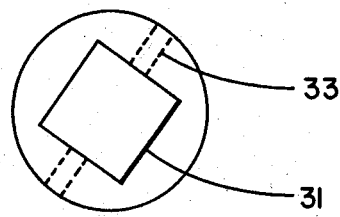
FIG. 4 is a view of the square socket end of the collar.
Figure 3:
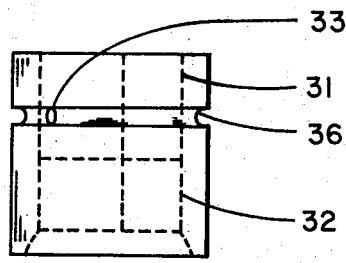
FIG. 3 is a side view of the collar.
Figure 5:
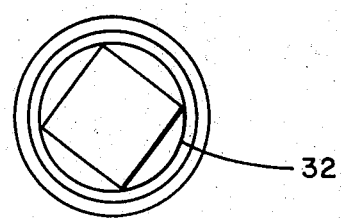
FIG. 5 is a view of the other end of the collar.

The collar 18, FIGS. 3, 4 and 5, is provided with an axial square hole 31. This square hole is relieved at one end to a round form 32. The collar 18 is provided with a diametral hole 33 for a pin (not shown), which is secured, when in place, by a rubber band 34 fitting into a circumferential slot 36. The diametral hole 33 is so positioned that when the collar 18 is slid along shaft 17 until the collar abuts the end of the body of the universal joint, the holes 33 and 23 are aligned and a pin can be inserted through them and held in place by the rubber band 34. In this position of the collar the shaft 17 is held rigidly aligned with the axis of the universal joint 16, which therefore can transmit rotating motion only in a straight line.

When the pin is removed and the collar is slid along shaft 17, away from the universal joint 16, to abut the flange 22, the holes 33 and 24 are aligned, and are pinned together. Then the universal joint is permitted full angular freedom and can transmit rotating motion through any angle within its angular limits.

The pin method of locking socket 19 to shaft 12 and of locking collar 18 to shaft 17, as described, is commonly used in large sizes of impact wrenches and universal joints. However, in place of the loose pins secured in place by rubber bands, spring-loaded pins may be used, in accordance with common practice. In such case the pin is disengaged by inserting a rod into the pin hole and pressing the pin back against its spring. The grooves 29 and 36 are then omitted, as are the rubber bands 28 and 34.

In place of the square shafts and square socket couplings described, spline couplings are sometimes used in the larger sizes, as are also spring-loaded pin locks.

In the operation of the described locking universal joint, the collar 18 is positioned in either of its two extreme secured positions, pinned to shaft 17 through either shaft hole 23, close to the universal joint 16 body, or through hole 24, further away from universal joint 16 body. When the collar 18 is close to the body of universal joint 16 the collar immobilizes the universal joint so that it can drive only in a straight line, but when the collar is at its other position, against the flange 22, it allows the universal joint to drive through an angle.

Figure 6:
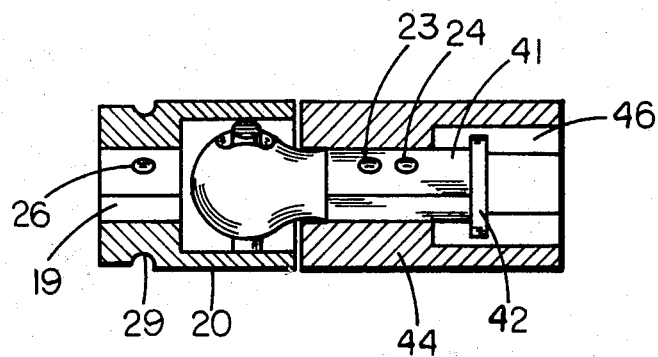
FIG. 6 is a cross-section view of the second embodiment.
Figure 7:
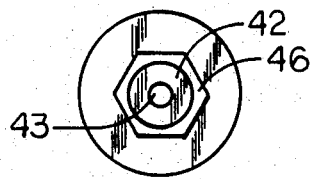
FIG. 7 is an end view of the second embodiment showing the wrench socket 46.

The second embodiment, shown in FIGS. 6 and 7, depicts part of the universal joint of FIGS. 1 - 5, including the body 20 with socket 19. However, in place of the elongated square output shaft 17, a square shaft 41 ends in a washer, 42, solidly fastened to the square shaft, for example, by welding. The washer 42 may be provided with a center hole, 43, to facilitate welding.

A sliding member, 44, slides on the square shaft 41, similar to the action of the collar 18 sliding on shaft 17, and has the same function of locking or unlocking the universal joint. However, the sliding member 44 is elongated and its end carries a socket 46, here shown as hexagonal to fit a nut to be tightened by the impact wrench.

Operation of the second embodiment is the same as the first embodiment except that, the universal joint and the wrench socket being integral, there is one less separate item for the operator to manipulate.

I claim:

1. A locking universal joint comprising:
    a body at one end thereof;
    a socket at the body end of the universal joint, serving as an input terminal;
    first means at the other end of the universal joint comprising a shaft having a non-circular cross section and terminating at the end distant from the said body in a washer, the outside diameter of the washer being greater than the minimum diameter of the cross section of the shaft;
    an element slideable on said shaft, bearing on the end distant from said body a shaped recess serving as an output terminal and termed a wrench socket; and
    second means removably locking said element in either of two positions on said first means.

2. A locking universal joint in accordance with claim 1 in which one of said two positions is with said sliding member abutting said body and in which the other of said two positions is with the sliding member abutting said washer.

3. A locking universal joint in accordance with claim 1 in which said second means comprises transverse holes in said shaft, a matching transverse hole in said sliding member and a pin passing through said sliding member hole and one of the holes in said shaft.

4. The combination comprising:
    an impact wrench; and
    a locking universal joint comprising:
    a body at one end thereof;
    a socket at the body end of the universal joint, said socket removably fitting the shaft output of said impact wrench and serving as the input terminal of the universal joint;
    first means at the other end of the universal joint comprising a shaft having a non-circular cross section and terminating at the end distant from said body in a washer, the outside diameter of the washer being greater than the minimum diameter of the cross section of the shaft;
    an element slideable on said shaft, bearing on the end distant from said body a shaped recess serving as an soutput terminal and termed a wrench socket; and
    second means removably locking said element in either of two positions on said first means.

5. The combination in accordance with claim 4 in which one of said two positions is with said sliding member abutting said body and in which the other of said two positions is with the sliding member abutting said washer.

6. The combination in accordance with claim 1 in which said second means comprises transverse holes in said shaft, a matching transverse hole in said sliding member and a pin passing through said sliding member hole and one of the holes in said shaft.

* * * * *